April 20, 1954
H. A. WILCOX
2,676,294
ELECTRIC MOTOR SYSTEM FOR GARAGE DOORS
Filed Nov. 13, 1947
5 Sheets-Sheet 1
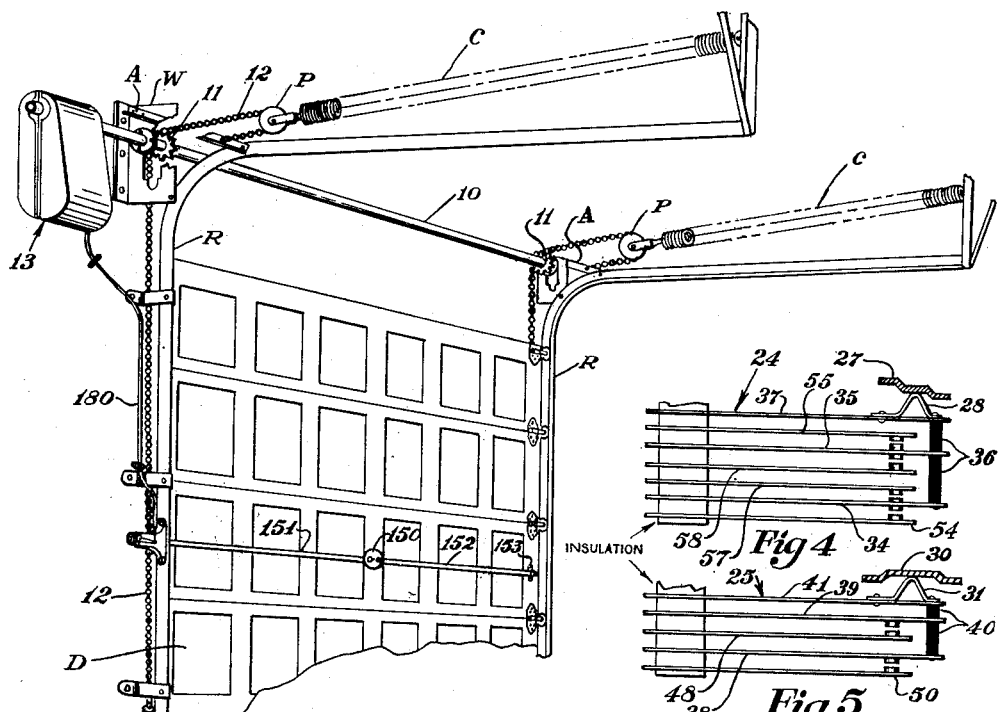
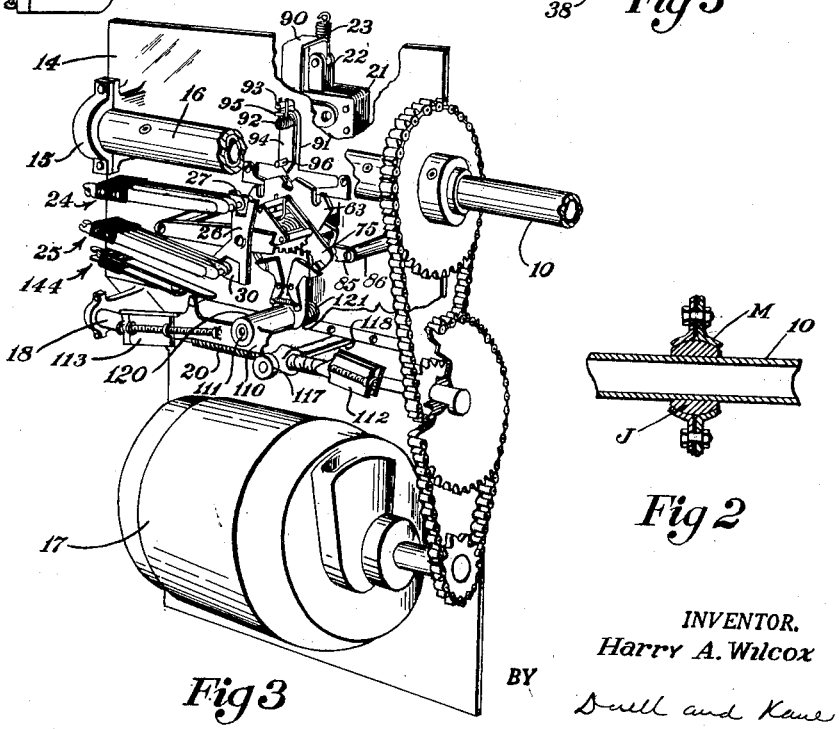
INVENTOR.
Harry A. Wilcox
BY
Duell and Kane
ATTORNEYS April 20, 1954  H. A. WILCOX  2,676,294
ELECTRIC MOTOR SYSTEM FOR GARAGE DOORS
Filed Nov. 13, 1947  5 Sheets-Sheet 2
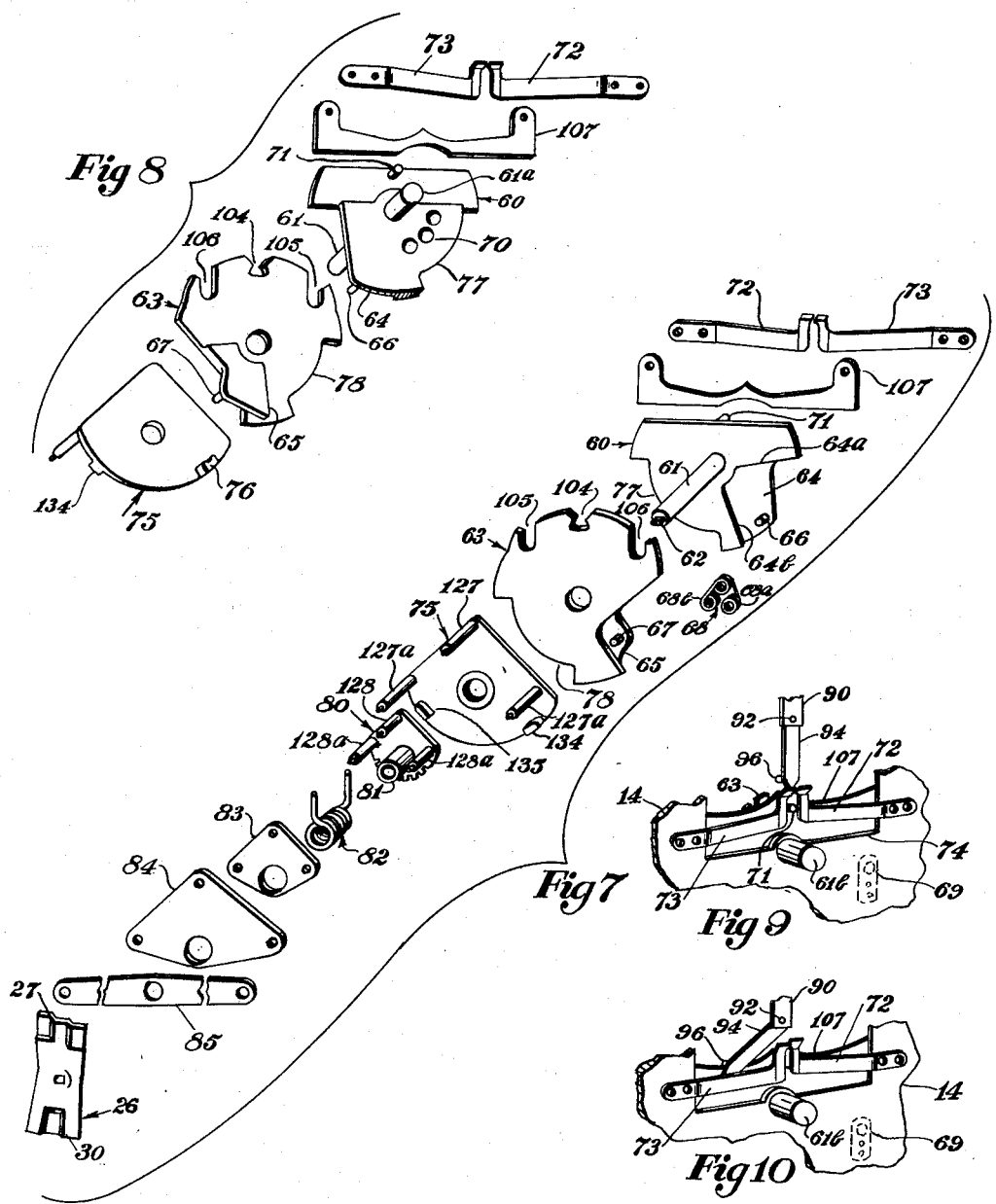
INVENTOR.
Harry A. Wilcox
BY
Duell and Kane
ATTORNEYS

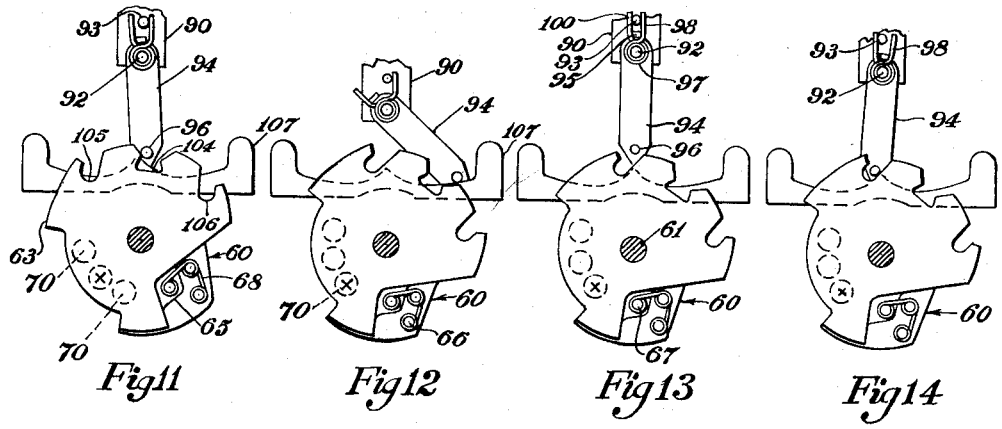
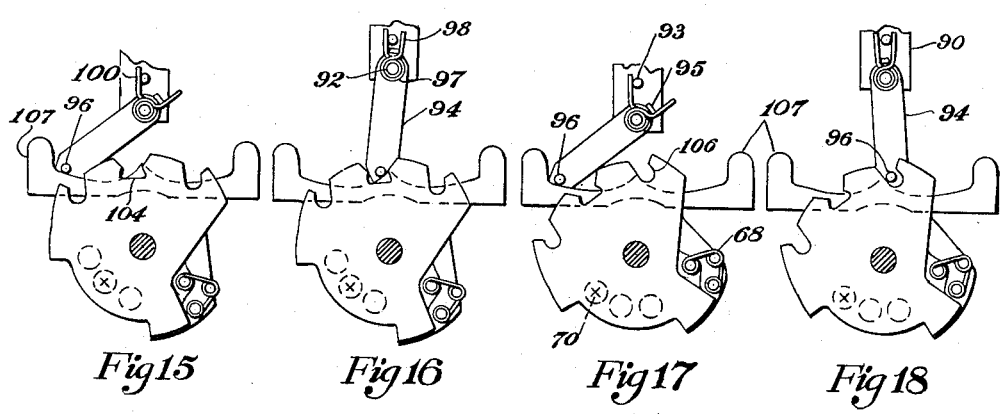
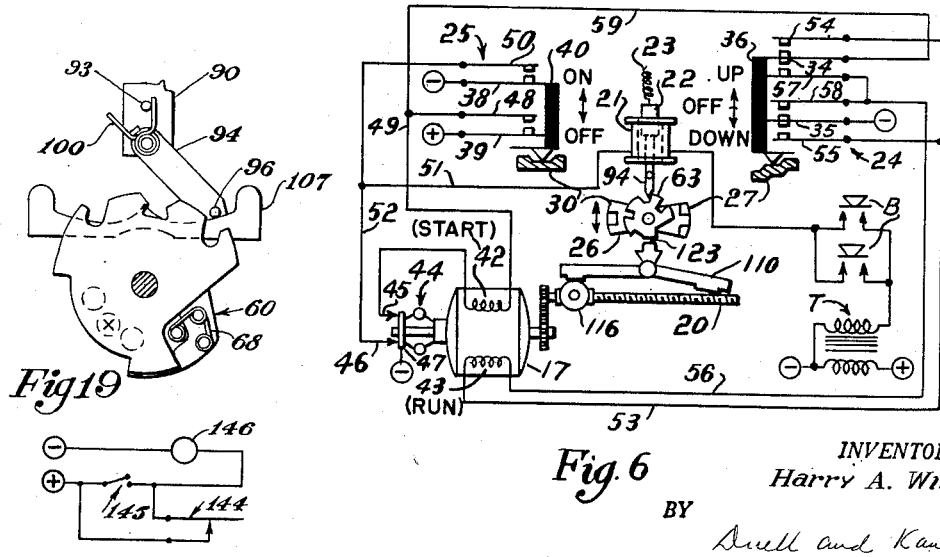

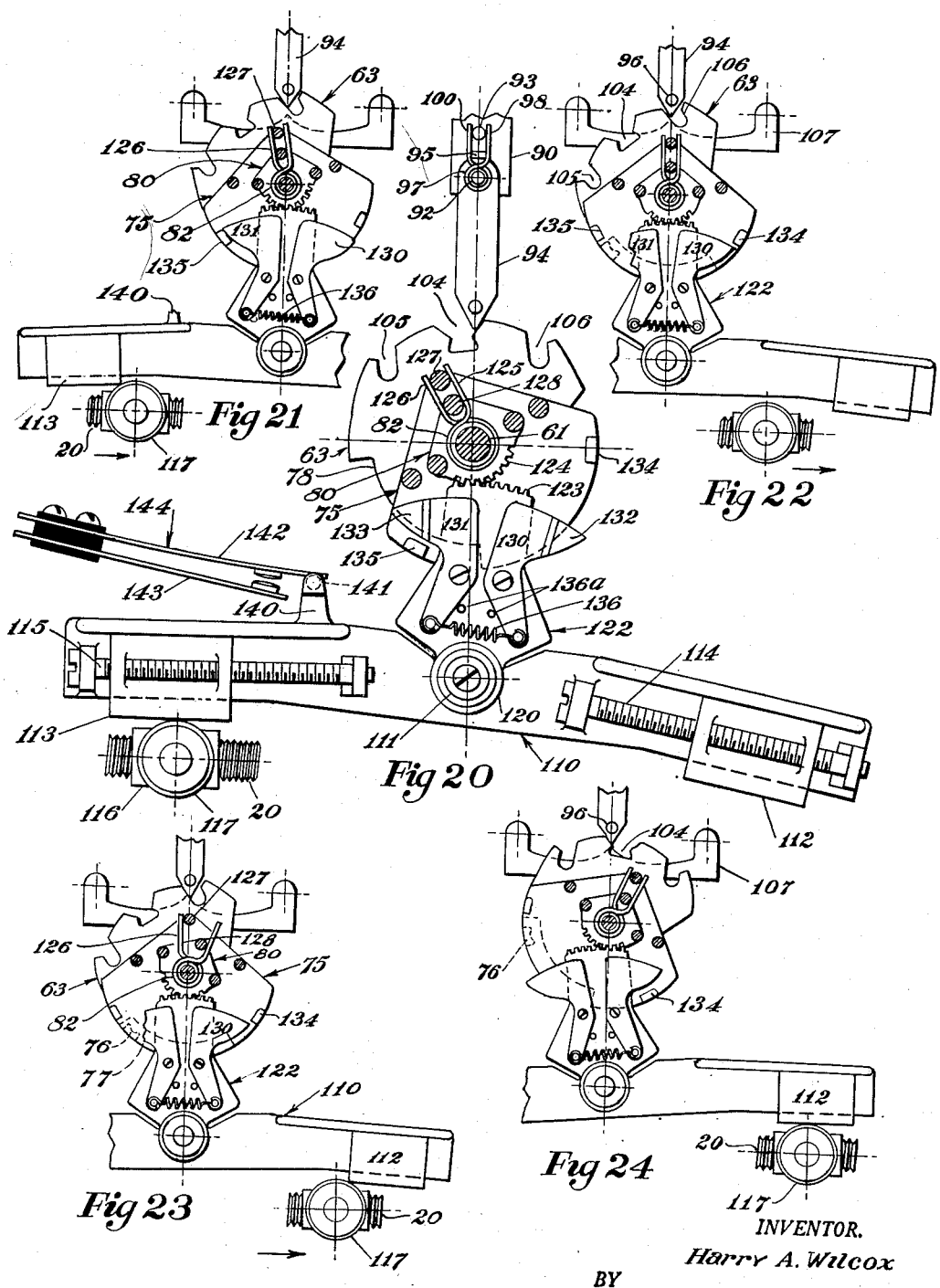

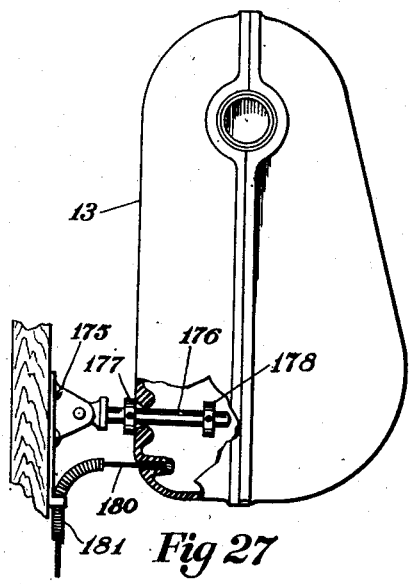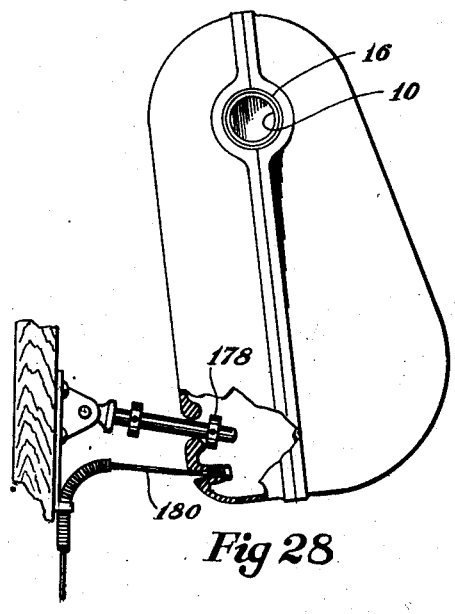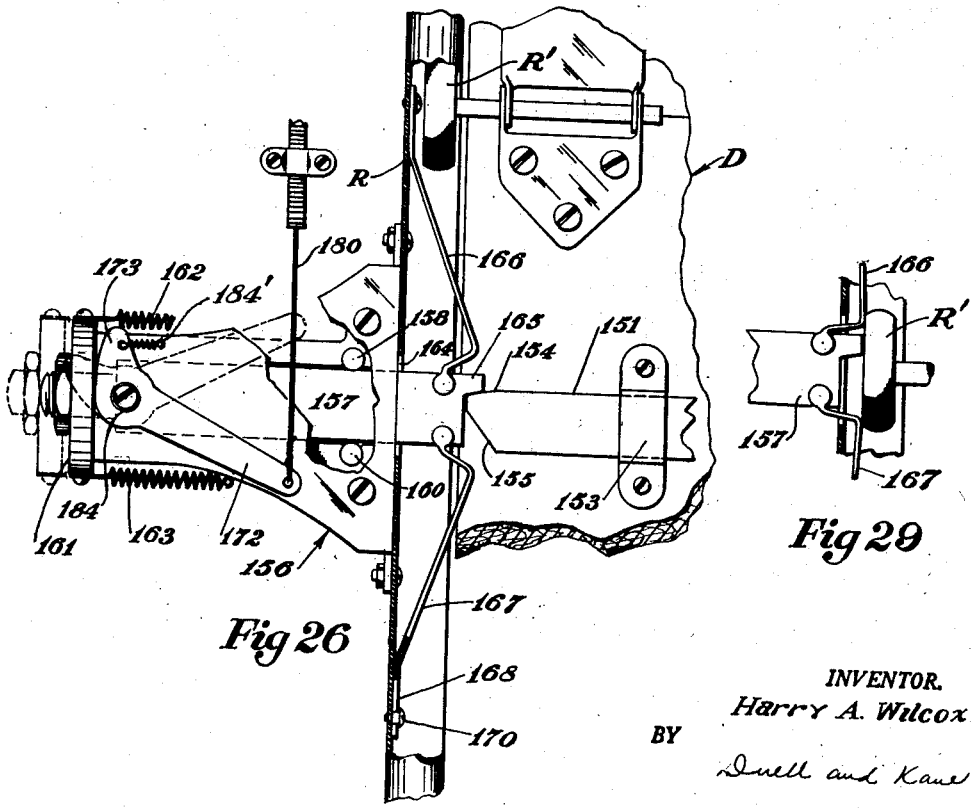

Patented Apr. 20, 1954

2,676,294

UNITED STATES PATENT OFFICE 2,676,294

ELECTRIC MOTOR SYSTEM FOR GARAGE DOORS

Harry A. Wilcox, Norwalk, Conn., assignor to Eastern Industries, Incorporated, East Norwalk, Conn., a corporation of Delaware Application November 13, 1947, Serial No. 785,569

17 Claims. (Cl. 318—266)

This invention relates to an improved automatic door operating mechanism, and is particularly adapted to doors of the overhead type, such as used in garages, warehouses, and the like.

Doors of this type utilize upwardly and rearwardly extending trackways within which ride rollers affixed to the sides of the door panel or panels and have extension spring and cable assemblies to assist in the raising of the door and to restrain the descent thereof.

The present invention is particularly suited for the conversion of existing installations to automatic operation in that the originally installed trackways and counterbalancing springs are retained, and a minimum of other structural changes or additions are required. On an existing door installation, for example, the conversion includes the installation of a sprocket wheel shaft across the top of the door opening inside of the garage and the substitution of chains, preferably roller chains, for the existing cables. The chains engage with the sprocket wheels provided on the shaft adjacent the side edges of the door panel. The drive motor and control unit is suspended from an extension of the shaft and rotates the shaft according to the desired direction of door movement. One end of each chain is affixed to the bottom edge of the door and the opposite end passes over the conventional pulley mounted on the free end of the counter-balancing spring and then is secured to the frame of the garage or some equivalent anchorage.

A novel control mechanism is provided to cause the motor to rotate in the forward or reverse direction, thus placing the chain under tension to raise the door or relieving such tension to permit the door to close under its own weight. Only a momentary closure of a single control switch circuit is required for raising or lowering the door. An automatic limit switch actuator for operation of a combined directional control and limit switch assembly for operation of the motor opens the motor circuit just prior to the end of door travel; the limit switch actuator also positions a directional control switch actuator for proper motor rotation to accomplish the next raising or lowering of the door upon the next closure of the control switch circuit.

An important feature of the invention is that if necessary, the door may be manually opened or closed without difficulty.

Because of the suspension of the motor and control unit, the starting torque of the motor will cause the unit to swing. This swinging movement is utilized to operate an automatic latch to unlock the door prior to opening. The automatic latch does not interfere with manual operation of the door, or with the operation of the usual key lock.

Claims to the automatic latch feature in connection with a door operating mechanism appear in my co-pending divisional application S. N. 406,269 filed January 26, 1954.

It is therefore an object of the invention to provide an automatic actuator for doors of the overhead type, which may be readily installed and utilizes existing or standard door hardware and accessories to a high degree.

It is another object of the invention to provide an automatic door operator which permits normal manual operation when necessary or desirable.

It is another object of the invention to provide an automatic switching mechanism for an electrically powered door actuator, said switching mechanism being operated by the momentary closure of a normally open push button or equivalent switch.

It is also an object of the invention to provide a directional control circuit actuator which closes the motor circuit for proper directional operation upon momentarily closing a control switch, and which presets for operation of the motor in the opposite direction upon the next momentary closure of said switch.

It is yet another object of the invention to provide an automatic door operator having an improved directional control circuit actuator and limit switch.

It is an object of the invention to provide an automatic door operator having an automatic direction control and limit switch actuator arranged so that limit switch operation automatically stops the drive motor and sets the directional control circuit actuator for operation of the motor in proper direction for the subsequent door movement.

It is an object of the invention to provide an automatic limit switch actuator to open the motor circuit sufficiently prior to the end of travel of the door to permit the door to coast to its ultimate open or closed position.

It is still another object of the invention to provide an automatic limit switch actuator for the motor circuit, having means for the control of an auxiliary circuit such as a lighting circuit.

With these and other objects in mind reference is had to the attached sheets of drawings illustrating one practical embodiment of the invention and in which:

Fig. 1 is a perspective of an installation of the invention as applied to a sectional type overhead door;

Fig. 2 is a detail in vertical section showing a typical self-aligning bearing for the sprocket shaft;

Fig. 3 is a perspective of the motor and control system, the enclosing casing having been removed, and showing the support of the control unit by the sprocket shaft;

Fig. 4 is a somewhat schematic side elevation of one switch group of the motor control switch assembly, the cam actuator therefor being shown in end section for purposes of illustration;

Fig. 5 is a somewhat schematic side elevation of an associated switch group of the motor control switch assembly, the cam actuator therefor being similarly shown in end section;

Fig. 6 is a circuit diagram for the directional control and limit switch action;

Fig. 7 is an exploded front perspective view of a portion of switch group actuating assembly;

Fig. 8 is a rear perspective view of a portion of the assembly of Fig. 7;

Fig. 9 is a rear perspective of a portion of the bed plate showing spring means for establishing a normal "off" position of the main switch actuator plate to prevent overthrow of this plate in returning to the "off" position;

Fig. 10 is a view similar to Fig. 9 showing the deflection of one of said spring means to permit rotation of said main switch actuator plate from the "off" position;

Figs. 11 to 19 inclusive illustrate phases of operation of the control switch actuating means in response to successive solenoid operations;

Figs. 20 to 24 inclusive show the control switch actuating means and associated door travel limit control in various stages of operation;

Fig. 25 is a circuit diagram of an auxiliary circuit;

Fig. 26 is a front elevation partly in section, of the automatic latching means;

Fig. 27 is a vertical side elevation, partly in section, showing the connection of the automatic latch actuating means with the control and the motor unit housing;

Fig. 28 is a view similar to Fig. 27 but showing the torque responsive movement of the motor and the control casing; and Fig. 29 is a front elevation showing the manner in which a door roller moves the latching bolt to permit said roller freely to pass said bolt.

Referring now to the drawings, Fig. 1 shows a conventional overhead door D to which door operating apparatus according to the invention has been applied. The door D has the usual rollers R¹ engaging within the upwardly and rearwardly extending rails, R, which guide the door in its opening and closing movements. As is well known, such doors are counter-balanced by means such as the extension springs C suitably anchored to uprights at the ends of the respective rails R and having at their free ends pulleys or sheaves P carried in suitable clevises. Ordinarily, before adapting the door for automatic operation pursuant to the present invention, the counter-balances are associated with the door by means of flexible cables which run from the respective lower corners of the door upwardly over the guide pulleys (not shown) fixed to brackets extending from the rails at the curved portion thereof, thence around pulley P to a suitable fixed anchorage above the door opening. When the door is in closed position the counter-balance springs are extended so that as the door is lifted, the contraction of the springs provides a portion of the power required to lift the door to its open position.

In adapting such conventional door for automatic operation pursuant to the present invention, the webs W of the rigid angle irons A affixed to the inner garage wall, secure the mountings M of spherical bearings J, shown in more detail in Fig. 2. Said bearings are in alignment to rotatably receive a main shaft 10 which extends above and parallel to the upper edge of the door. The spherical self-adjusting or self-aligning bearings compensate for the frequently experienced mis-alignment of the webs W in existing installations.

Sprockets 11 are fixed to the shaft 10 in suitable relationship with rails R, and each sprocket cooperates with a roller chain 12 which is substituted for the conventional flexible cable. It will be noted that at each side of the door, chain 12 extends from the lower corner thereof upwardly over the sprocket 11 around the pulley P, and thence to an anchorage. Rotation of the shaft 10 in clockwise direction (as seen in Fig. 1) will lift the door by means of the roller chains; the counter-balance springs assisting in such operation. When the door is to be closed the shaft and sprockets are rotated in the opposite direction, relieving the spring tension on the chains between the sprocket and the point where the chain is attached to the door, and permitting the door to close of its own weight. During such closing movement the counter-balance springs are again extended for the next door-opening operation.

Referring now to Figs. 1 and 3, a motor and control housing 13 includes a bed plate 14 on which the motor and the several control devices are carried. Carried in bearings 15 extending outwardly from the bed plate is a tubular main shaft 16 which telescopes over an extension of the shaft 10 and is secured thereto by means such as set screws or their equivalent. The motor housing 13 is therefore swingably carried by the shaft 10 and is permitted a limited rotation as later described.

In order to permit the outer parts and some of the underneath parts of the door operator control assembly to be seen more clearly, this assembly is shown in Fig. 3 in an intermediate position with the power off after the door has been raised to a partly open position, instead of in the full down position of the door as shown in Fig. 1.

The bed plate 14 carries a reversible electric motor 17 which drives the main shaft 16 through suitable speed reduction means such as the illustrated chain and sprocket organization to move the door at a relatively slow speed. A lay shaft 18 comprises an element of the speed reduction means and by means of a centrally threaded portion 20 operates the switch assembly as hereinafter described. Disposed on the rear of bed plate 14 is a solenoid 21 having an armature 22 which is normally held in extended position by means such as the spring 23.

The motor is controlled by a pair of multi-contact switches 24, 25 which are respectively operated by a two-lobed cam plate 26 arranged to rotate in either direction over a total arc of about 60 degrees. The upper lobe 27 of the cam (see Figs. 3 and 4) has a stepped end cooperating with which is a follower 28 of switch group 24. As shown in Figs. 4 and 6 the respective switch arms and contact structures of the switch will open the circuit, or close the circuit for forward or reverse motor operation, according to the position of the follower 28 with respect to the stepped end of the cam. The central step of said cam lobe is the "off" position.

The lower end 30 of cam 26 has a cavity flanked by steps of equal height. The lower switch group 25 similarly has a follower 31 for cooperation with said cam configurations, and according to the position of the cam with respect to the follower 31 the motor circuit will be either in "on" or "off" condition, the central cavity representing the "off" condition and the adjacent steps operating switch 25 to close the motor circuit.

It will be noted that when cam plate 26 is substantially vertical as in Fig. 3, both switches will be in open circuit position, and that when the cam is rotated therefrom approximately 30 degrees in either direction, both switches will be in closed circuit position, group 24 being in either "up" or "down" motor control position according to the direction of cam rotation.

The starting of the motor for raising or lowering the door, is under the control of one or more momentary contact switches B suitably mounted within the garage or at other convenient location. These switches may be simple push buttons in a low voltage circuit, as shown in Fig. 6. The stopping of the motor is under the joint control of the push button and of a limit actuator which operates to open the motor circuit shortly before the completion of the upward or downward travel of the door. In normal operation this action of the limit actuator stops the motor. However, the push button may be operated to stop the motor before the door has reached the point at which the limit actuator would operate.

An actuation of switch B when the door is at rest will start it in the direction opposite to the direction it had immediately prior to coming to rest. This selection of direction of movement is automatically provided by the action of the control switch actuating means, as more fully described below.

*The control circuit*

Referring now to Figs. 4, 5, and 6, it will be noted that switch group 24 comprises a double pole, double throw switch in which the respective contact springs are maintained in properly spaced mutually insulated relationship by suitable insulating blocks or posts, and that the movable contact springs 34, 35, and the cam follower arm 37 are joined for simultaneous movement by the insulating posts 36. Switch group 25 is a double pole, single throw, switch in which the contact springs are also suitably carried by an insulating block. The movable contact springs 38, 39 and the cam follower arm 41 are joined by the insulating posts 40.

The direction of operation of the switches for accomplishment of their respective functions is indicated by the double arrows adjacent the switch representation on Fig. 6. It may be noted at this point that the operating surfaces of cam 26 are so arranged that switch 24 makes first and breaks last and that switch 25 makes last and breaks first. Thus, the relatively simpler switch 25 handles the load and switch 24 merely switches the motor circuits.

Motor 17 has a conventional starting winding 42, running winding 43, and a centrifugal switch 44 modified to provide two contacts 45, 46 for cooperation with the bridging arm 47 which is connected to negative polarity. Contact spring 35 of switch 24 is negative; contact springs 38 and 39 of switch 25 are respectively negative and positive; and the push button lead of solenoid coil 21 is connected to positive. Said solenoid coil is preferably actuated by low voltage, say 20 volts, provided by transformer T, although it will be understood that if desired this may be eliminated and the solenoid served by 110 volts.

Contact spring 48 of switch 25 connects by lead 49 to one end of the starting winding 42, the other end of which connects through contact 45 and bridging arm 47 to negative polarity when the motor is stopped or when its speed is below the critical speed at which the centrifugal switch operates.

When switch 25 is in the closed position, with the door moving either upward or downward, negative potential is applied to the negative side of the solenoid coil 21 through contacts 38 and 50 of switch 25, through wire 51 to the negative side of the coil 21, so that any time the motor is running another actuation of push button B will cause the solenoid coil to be energized. When switch 25 is in the "off" position, negative polarity is no longer applied to solenoid coil 21 and another actuation of pushbutton B will not cause solenoid coil 21 to operate until the motor armature has slowed down enough so the centrifugal switch 44 permits contact 46 and bridging arm 47 to close the circuit whereupon negative polarity will be supplied through arm 47, contact 46, wires 52, 51 to the negative side of solenoid coil 21.

These connections prevent the solenoid from operating switches 25 and 24 until the motor has slowed down enough to close its centrifugal switch, so that the next closure of the motor circuit will cause the motor to operate in the correct direction, but while the motor is running another actuation of pushbutton B will always cause the motor to be turned off.

One end of running winding 43 connects by lead 53 to contact springs 54, 55 of switch 24; the other end of the running winding connects by lead 56 to contact springs 57, 58 of switch 24. Contact spring 34 of said switch connects by lead 59 to contact spring 48 of switch 25.

Assuming the door to be in the up position, the closing of button B will energize solenoid 21 and by means presently described will actuate cam 26 in a direction to cause contact springs 34, 35 to move to the position which will connect the motor for downward motion. Negative polarity is applied to one end of the running winding through contact springs 35, 55 and lead 53. The other end of the running winding 43 is connected through lead 56, contact springs 57, 34 and lead 59 to contact spring 48 of switch 25. A fraction of a second later, switch 25 closes and positive polarity will be applied to contact spring 48 by contact spring 39, thus connecting running winding 43 across the line in the direction for correct downward operation of the door.

Upon closure of switch 25, positive polarity is also applied to one end of the starting winding 42 through contact springs 39, 48 and lead 49. The other end of the starting winding 42 is already connected to negative polarity through contact 45 and arm 47. Since the motor is stopped and the centrifugal switch is closed, and since power is now applied to both starting winding 42 and running winding 43 the motor will thereupon start and run in the correct direction to give downward motion of the door. As soon as the motor speed exceeds the critical speed for which the centrifugal switch is set, contact 45 and arm 47 will operate and the motor will continue to run in the same direction on its running winding 43.

It will be apparent that operation of the switch 24 in the opposite direction will reverse the polarity of the running winding for motor rotation in the opposite direction.

The directional operation control

Fig. 7 illustrates in exploded view, a number of cooperating parts of the mechanism for rotating the cam 26 clockwise or counterclockwise in response to push button solenoid operation or limit control operation. Fig. 8 shows a rear view, with respect to Fig. 7, of certain of the parts of Fig. 7 and should be considered along with Fig. 7 in connection with the following description.

A main switch plate 60 is secured to or integral with a shaft 61, a rear extension 61a of which is journalled in bearing 61b in the bed plate 14, shown in Fig. 9, and the front portion 61 of which terminates in a non-cylindrical tip 62 to which the cam 26 is affixed. Freely rotatable on shaft 61 and overlying plate 60 is a selector plate 63. Selector plate 63 is provided on the surface which is nearer main plate 60 with a lug 65, and main plate 60 has a depression 64 of somewhat larger angular dimensions than lug 65 in which lug 65 can move through an arc restricted by the edges 64a, 64b, of the depression. Each of the said plates has a pin extending therefrom, respectively pins 66 and 67, over which ends 68a and 68b respectively of toggle spring 68 are rotatably fixed. Toggle spring 68 serves to hold selector plate 63 in one of two possible stable angular relationships with plate 60, which are shown in Figs. 11 and 16 respectively. The toggle action is provided by a shortening of the distance between ends 68a and 68b of spring 68 as pins 66 and 67 pass each other in going from one stable condition to the other.

The rear wall of plate 60 is provided with three equi-angularly spaced detent sockets 70 which cooperate with a suitable spring detent 69 (shown in dotted line in Fig. 9) extending forwardly from the bed plate 14. Plate 60 is also provided with a rearwardly extending centering pin 71 for cooperation with the centering spring leaves 72, 73 affixed to a rear wall of the bed plate 14 and projecting forwardly through a window 74 therein (see Fig. 9). These spring leaves provide position means for holding the main plate in open circuit position and are moved out of holding position by the operation of the actuating arm, as later described. A snap plate 75 is freely rotatably carried on shaft 61 adjacent to plate 63. The snap plate has a rearwardly extending lug 76 (see Fig. 8) which rides within the aligned arcs 77, 78, formed respectively in the plates 60 and 63, said arcs each terminating in substantially radial end walls as shown in Fig. 7.

Also carried by said shaft 61 is a spring plate 80 having a cylindrical hub 81 which carries a helical torsion spring 82. The posts 128, 128a, 127 and 127a extending from the spring plate 80 and snap plate 75 respectively support cover plates 83, 84. The final item of the assembly is the shaft support 85 within which shaft 61 is journalled near its end, and which is suitably supported on posts 86 as shown in Fig. 3.

Referring again to Fig. 3, the armature 22 of solenoid 21 moves radially of shaft 61. A slide 90 is affixed to armature 22 and is suitably guided for movement radially of shaft 61. Illustratively said armature and slide move in a vertical plane to drive an arm 94 for engagement with one or another of the notches 104, 105, 106 in selector plate 63 as shown in Figs. 11–19, the normal position with the solenoid deenergized being shown in Figs. 3 and 13. Bed plate 14 is provided with a window 91 having a length somewhat greater than the total movement of the armature 22. Affixed to said slide and extending through the window are a pivot post 92 and a stud 93. Pivotally carried upon post 92 is an actuating arm 94 having an outwardly projecting lug 95 at its upper end and an operating pin 96 projecting forwardly adjacent its lower end. Post 92 carries a torsion spring 97 (see Fig. 13) having upwardly extending ends 98, 100 which straddle the stud 93 and lug 95 so as normally to hold the arm 94 radial of shaft 61 but permitting said arm 94 to be deflected to the right or left of said shaft as clearly appears in the series of figures from Fig. 11 to Fig. 19.

It has previously been noted that cam 26 is affixed to shaft 61 for rotation therewith and that rotation of said cam in one or the other direction causes the cam surfaces thereof to operate the respective switch groups 24 and 25. Direction control of the motor is accomplished by momentarily closing switch B to energize the solenoid 21, therefore drawing armature 22 and the therewith associated arm 94 downwardly. The direction of rotation of cam 26 controls the direction of motor operation and the function of the selector plate 63 is to deflect the end of arm 94 and to translate the downward movement thereof into proper directional rotation of plates 63 and 60, and shaft 61.

Selector plate 63 is provided with three notches, 104, 105, 106, with one of which the pin 96 engages as arm 94 drives downwardly to rotate the selector plate accordingly. Said notches are, in effect, cams which determine the direction of rotation of said plate and have sloping edges which deflect the pin 96 to the correct side of the center line so that, for example, cam 26 will be rotated from its mid-position ("off" position) to close the "up" circuit if the last motion of the door was downward, or to close the "down" circuit if the last motion of the door was upward, and cam 26 will be rotated to its mid-position from either "up" or "down" position if the solenoid is reoperated with cam 26 in the "up" or "down" position respectively.

The notches 104, 105, 106 are symmetrical. The center notch 104 has two convergent edges, one or the other of which will intersect the vertical center line of shaft 61 when the main plate 60 is in "off" position depending on whether the last movement of the door was upward or downward. As the arm 94 drives downwardly its pin 96 will engage one or the other of the side edges of notch 104 and be deflected to the pocket at the opposite end of the base of the notch, thereby rotating plate 63 until an edge of lug 65 engages with edge 64a or 64b (according to direction of rotation of plate 63) to rotate the main plate 60 accordingly. After such rotation an edge of either notch 105 or 106 will be in position to cause rotation of plate 63 in the opposite direction on the next downward movement of arm 94.

A symmetrical guide plate 107 is fixed behind main plate 60 to deflect the pin 96 of arm 94 out of engagement with plate 63 at the end of the stroke. This is desirable for proper operation of the limit switch action at the end of door travel if, for example, a person held switch B closed (thus keeping solenoid 21 energized) during the full movement of the door.

Main plate 60 has three resting positions approximately 30° apart, as determined by the three detent sockets indicated by the circles 70. Thus the total movement of the main plate 60 for any one solenoid actuation is of the order of 30°. As previously pointed out, selector plate 63 may be rotated through a limited arc with respect to the main plate 60, under control of the toggle spring 68. For example, if the selector plate 63 and main plate 60 are in the right-hand position, as shown in Fig. 14, the first action of arm 94 in the downward stroke is to shift selector plate 63 through its limited arc with respect to main plate 60, while the latter is being held by detent 69 engaging the lower socket 70 marked "X" in Fig. 14. As the stroke of arm 94 is continued downward and to the left, lug 65 of selector plate 63 drives main plate 60, so that both plates rotate approximately 30° to the middle position the detent now being in the center socket, at the end of the stroke, as indicated in Fig. 15.

The sequence of Figs. 11 to 19 shows the operation of plates 63 and 60 at varying stages of actuator arm operation.

In Fig. 11 the garage door is in full up position; the switch B has been closed, and arm 94 has begun to drive downwardly. Pin 96 strikes the left hand edge of notch 104 and engages the opposite lower corner thereof causing a clockwise rotation of plates 63 and 60, and shaft 61. Fig. 12 shows the end of the actuator stroke and shows that pin 96 has been disengaged from plate 63. The position of the detent symbol "X" indicates that the cam 26 has rotated to operate switch stack 24 to "down" circuit position, and stack 25 to "on" position.

Fig. 13 illustrates the condition when button B has been released de-energizing the solenoid and permitting spring 23 (Fig. 3) to retract the arm 94 to its centered position. It will be noted that an edge of notch 105 intersects the vertical center line. The switch cam 26 is still in circuit closing position for downward door movement. Fig. 14 shows the commencement of another downward movement of arm 94 and the deflection thereof to the left of the center line. Fig. 15 depicts the end of the stroke, the disengagement of pin 96 from plate 63 by guide plate 107 and the return of the switch cam (as represented by the position of detent "X") to "off" position. It will be seen that notch 104 is overthrown with respect to the center line and that its right hand edge intersects said line.

In Fig. 16 switch B has been opened and again closed and actuator 94 has commenced another downward stroke. The right hand edge of notch 104 is deflecting the actuator to the left and at the completion of the stroke (Fig. 17) the cam 26 is in "up" circuit position, and the edge of notch 106 angularly intersects the center line. Figs. 18 and 19 respectively illustrate an intermediate stage and a completion of another downward stroke of actuator 94 and the return of switch cam 26 to "off" position.

As has been previously stated main plate 60 has a pin 71 projecting from its rear wall, said pin snapping into the space between the detent springs 72 and 73 to hold cam plate 60 in a fixed centered position. One or the other of said spring detents is moved rearwardly out of the way by engagement of the rear surface of arm 94 therewith as said arm commences its downward stroke, as shown in Fig. 10.

*The limit switch control*

The limit switch operates automatically to open the motor circuit as the door approaches its fully opened or fully closed position, the door coasting to the ultimate open or closed position after the motor circuit has been broken.

Referring now to Figs. 3 and 20 to 24, a walking beam 110 is rotatably mounted on a pivot post 111 extending forwardly of the bed plate 14. The arms of said beam are of equal length and slidably mount cam blocks 112, 113, which are individually adjustable relative to the pivot post. The illustrated adjustment screws 114, 115, or other equivalent means, may be employed to establish the correct location of the cam blocks for proper switching operation. Non-rotatably mounted on the threaded central portion of lay shaft 20 is a nut 116 having a roller 117 for cooperation with the cam blocks as the nut travels along the lay shaft. An extension 118 on said nut rides within a suitable slot in the bed plate to prevent the rotation of the nut.

Depending upon the direction of rotation of motor 17 the nut travels along the lay shaft until roller 17 contacts a cam block whereupon, the block is raised by the roller and the walking beam and its hub 120 is rotated through a small arc, to operate switch cam 26 as presently described.

It will be recalled that the door is lifted on roller chains running on sprockets, and the position of the nut on the lay shaft therefore is in a definite relationship to the position of the door. To suit existing conditions, the location of the cam blocks may be adjusted after one or two trial runs.

A torsion spring 121 maintains the beam 110 in horizontal position, except when it is deflected by the roller 117 engaging one of the blocks 113, 114.

Affixed to hub 120 for rotation therewith is a plate 122 (see Fig. 20) having a gear sector 123 meshing with a gear sector 124 formed on the lower edge of plate 80. The gear ratios are preferably such that a rotation of plate 122 of about 6 degrees produces a rotation of plate 80 of slightly over 30 degrees. Torsion spring 82 has upwardly extending legs 125, 126, which straddle the upper center posts 127, 128 respectively projecting forwardly of plates 75 and 80.

Plate 122 pivotally mounts a pair of dogs 130, 131, the respective inwardly offset ends 132, 133 of which are in the path of rotation of lugs 134, 135 extending forwardly from plate 75. At their lower ends said dogs are connected by spring 136. Inward motion of the lower legs of the dogs is restricted by stops 136a.

Fig. 20 represents a condition where the door is in its fully down position. Nut 116 has travelled to the left and its roller 117 has engaged block 113 to rotate beam 110 clockwise. Plate 80 has thereby been rotated counterclockwise and spring arm 126 has acted on pin 127 to rotate plate 75 counterclockwise as soon as dog 131 has been carried clockwise far enough about pivot post 111 by movement of beam 110 and plate 122, to permit end 133 of dog 131 to become disengaged from lug 135. Lug 76 of plate 75 has turned selector plate 63, which has turned main plate 60 and shaft 61, counterclockwise, thus throwing switch cam 26 to "power off" position.

On the next closure of switch B to energize the solenoid 21 to drive arm 94 downwardly, plate 63 and its associated plate 60 will rotate counterclockwise to throw the switch cam 26 to close the "up" circuit of switch 24 and the "on" circuit of switch 25 and the door will start to rise. Plates 63 and 75 are independently rotatable at this point and therefore the subsequent movement of plates 75 and 80 does not produce rotation of plate 63.

The motor commences operation to raise the door and nut 116 travels to the right. At this point the respective switch actuator plates are in the Fig. 21 position and roller 117 is about to disengage from block 113. Torsion spring 121 (Fig. 3) is returning the beam to horizontal and the clockwise rotation of plate 80 is rotating plate 75 clockwise, since spring end 126 is driving plate 75 through stud 127. Lug 135 is engaging with the curved undersurface of dog 131 rotating it on its pivot against the tension of spring 136, and is about to snap over the end of said dog.

At Fig. 22 the roller 117 has disengaged from block 113 and spring 121 has stabilized beam 110. Plate 122 is vertical; posts 127 and 128 are in vertical alignment and lugs 134 and 135 are resting upon the upper surfaces of the ends of the dogs 130 and 131. Plate 63 has not changed its position after having been rotated counterclockwise by arm 94, and notch 106 is in position for engagement by pin 96 for the operation of plates 63, and 60, should it be desired to stop the door in mid-travel.

At Fig. 23 the door is approaching full up position; roller 117 has engaged block 112 and has begun to rotate beam 110 and its associated gear plate 122 counterclockwise. Dog 130 is still in engagement with lug 134 preventing rotation of plate 75 as the clockwise rotation of plate 80 and the pressure of post 128 against spring leg 125 tensions the spring 82, because the then motionless post 127 restrains the movement of the spring leg 126. As block 112 continues to climb on roller 117, and beam 110 and gear plate 122 continue rotation, dog 130 releases lug 134 and the reacting spring 82 snaps plate 75 sharply clockwise. As it does so its rearwardly extending lug 76 strikes the left hand end of the aligned notches 77 and 78 and rotates plates 63 and 60 clockwise, thereby rotating shaft 61 to bring switch cam 26 to the central, i. e. open circuit position. The switch actuator devices are then in the Fig. 24 position, in which the door is fully raised and the power is off. It will be noted from Fig. 24 that notch 104 is in position relative to pin 96 so that the next downward movement of said pin will rotate plates 63 and 60 to close the motor circuit for down movement.

It will also be noted that there are two different midpositions of the selector plate, which may be referred to as the right biased mid-position as in Fig. 11 and Fig. 19 and the left biased mid-position as in Fig. 15 and Fig. 16. The right-biased mid-position is biased for rotation of the selector plate to the right (clockwise), to the downward driving switch position shown in Figs. 12, 13, and 14, by the next push button actuation. The left-biased mid-position is biased for rotation of the selector plate to the left (counterclockwise), to the upward driving switch position shown in Figs. 17 and 18, by the next push button actuation.

Summarizing briefly a normal cycle of operation of the door operator starting with the door resting in fully closed position, and with the selector plate in its left-biased mid-position, an actuation of switch B will operate the solenoid to rotate the selector switch actuator assembly to the left (counterclockwise) to close the upward drive motor circuit to raise the door, and this driving action drives roller 117 to the right to raise the right end of the walking beam 110 to rotate the selector switch actuator assembly clockwise to the right-biased mid-position to open the motor circuit as the door nears the end of its upward travel to allow the door to coast to a stop in fully open postion.

The next actuation of switch B will now operate the solenoid to rotate the selector switch actuator assembly to the right (clockwise) to close the downward drive motor circuit to lower the door, and this driving action drives roller 117 to the left to raise the left end of the walking beam 110 to rotate the selector switch actuator assembly counterclockwise to the left-biased mid-position to open the motor circuit as the door nears the end of its downward travel to allow the door to coast to a stop in fully closed position.

It will be understood that the switch B may be operated directly by hand by a person or may be a key operated switch for operation only by an authorized person with the proper key. It will be understood further that one switch B may be located on a post alongside the driveway and another switch B may be located inside the garage or inside a house associated with the garage, or that one switch may be operated by remote control by conventional magnetic, photo-electric, sonic or supersonic, radio or other systems if desired, either directly by an automobile in the driveway of the garage or by a person actuating a remote control device in the automobile, the particular location of the switch or switches B and means of actuating the same not being a part of the invention.

*Auxiliary circuit control*

Oscillation of beam 110 may be used to control any supplemental or auxiliary electric circuit, such for example, as a garage light circuit so arranged that the light will be extinguished as the garage door closes. Accordingly beam 110 is provided with a finger 140 the end of which may have an insulating coating, and carrying an insulated pin 141 for engagement with a spring arm 142 which cooperates with a fixed contact 143 of the switch 144 suitably mounted on the bed plate.

The circuit diagram on Fig. 25 is self-explanatory. Switch 144 is in parallel with the usual garage light switch 145 so that when the garage door is down, light 146 is controllable independently of switch 144. It will be obvious that separate lights may be provided and independently controlled by switches 144 and 145 instead of connecting these switches in parallel as shown. When the garage door is out of the fully down position to any extent so that roller 117 is off of block 113 the beam 110 will have been rotated counterclockwise out of the Fig. 20 position so that finger 140 will have been rotated away from contact arm 142 to permit said arm to come to closed circuit relationship with contact arm 143. As the door closes, assuming switch 145 to be open, the rotation of beam 110 in its clockwise direction by roller 117 raising block 113 will raise the arm 142 to open the light circuit.

The latch actuator

Doors of the overhead type are conventionally equipped with a locking mechanism which includes a rotatable disc 150 (Fig. 1) at diametrically opposite locations on which are lock bars 151, 152, guided in one or more brackets 153 affixed to the door. Said lock bars cooperate with openings provided in the web of the rails R. Rotation of the disc 150 through about ninety degrees extends said bars to pass through the openings thereby securing the door against upward movement.

In the present invention advantage is taken of the permitted rotational movement of motor housing 13 on shaft 10 to unlatch the door. In applying this feature of the invention to a standard door having locking bars, the bars 151, 152 are shortened so that when they are in their usual extended or locking position they terminate just inside of the edge of the door D, as shown in Fig. 26. The upper edge of bar 151 is preferably slightly sloped as at 154, and the lower edge is more sharply angled as at 155.

Affixed to the outer wall of the web of one rail R is the housing of a latch 156. Said latch has a bolt 157 guided for free reciprocal movement within the latch housing as on rollers 158, 160. A relatively large diameter plate 161 is screwthreadedly affixed to one end of said bolt, and parallel springs 162, 163 anchored thereto and to the latch housing urge the bolt to the right of Fig. 26; the plate striking the end of the latch housing to limit the movement.

Bolt 157 projects through the opening 164 in rail R. It is usually necessary to enlarge the standard opening with which the rail was originally provided. As clearly appears, the bolt in home position, extends beyond the edge of the door and the nose 165 of said bolt overlies the bar 151 to secure the door against being opened.

In most overhead type doors one or more guide rollers R¹ must pass the bolt during the opening or closing of the door and there are therefore provided deflector arms 166, 167 having studmounting ends which rotatably engage within suitable sockets formed in the upper and lower edges of the bolt. Said deflector arms are slidably attached to the inner wall of the rail R and accordingly the end of each arm is slotted as at 168 (Fig. 26) for cooperation with the shank of a screw 170 passing into said wall. As is shown in Fig. 29 the edge of a door roller will strike an arm 166 or 167 camming it rearwardly to retract the bolt out of the path of the roller. Slot 168 permits sliding movement of the arm relative to the rail.

A cam lever 172 is pivotally attached to the latch housing on stud 184 and has a cam surface 173 for cooperation with plate 161. Said cam surface is so shaped that when the lever 172 is in the full line position of Fig. 26 the bolt is in extended or "home" position. When the cam lever 172 is rotated counterclockwise to the broken line position, cam 173 drives the plate 161 and its associated bolt 157 to the left for disengagement with the lock bar 151. The door may then be raised.

Referring now to Figs. 27 and 28 there is pivotally attached to a bracket 175 affixed to the frame of the building a guide rod 176 which projects through the wall of casing 13 as shown. Adjustable stop plates 177, 178 are provided on rod 176. Suitably attached to the wall of housing 13 is a stiffly flexible wire 180 such as a "Bowden" wire; the flexible outer sheath 181 thereof being affixed by suitable brackets to the building wall. The other end of wire 180 is attached to the lever 172 as shown in Fig. 26.

Assuming the door to be in a down position and push button B pressed to close the motor circuit the starting torque of the motor will cause the housing 13 to swing with respect to the wall and will cause wire 180 to lift lever 172, thereby drawing bolt 157 to the left of Fig. 26 to disengage from the locking bar 151 and permitting the door to rise.

It will be understood that stop plate 178 permits rotation of the motor housing 13 slightly in excess of the extent necessary to rotate cam lever 172 sufficiently to withdraw the bolt 157. Stop plate 177 prevents rotation of the motor housing in the opposite direction. When the motor comes to rest upon completion of the door opening operation the motor casing will have returned to the Fig. 27 position. Since the running torque is much less than the starting torque the housing 13 will return substantially toward the Fig. 27 position during the upward movement of the door and during such return the Bowden wire 180 will permit lever 172 to return to normal position under urging of suitable spring means such as the spring 184.

During the downward movement of the door the rotation of the motor housing is prevented by the stop plate 177 and there will be no movement of lever 172. As the door moves downwardly the surface 155 of locking bar 151 will strike the arm 166 and the nose 165 of bolt 157 and move the bolt inwardly to permit the bar to pass the bolt and come into position beneath the nose 165 thereof.

As is known, the disc 150 is manually rotatable both from within and without the door. No part of the latch 156 interferes therefore with the normal operation of the locking bars and the bolt may be retracted from inside or outside of the door and the door raised without recourse to the automatic door operating mechanism.

Thus, among others, the several objects of the invention as aforenoted are achieved. Obviously numerous changes in construction and rearrangement of the parts might be resorted to without departing from the spirit of the invention as defined by the claims.

I claim:

1. In a door operating mechanism in combination, movable switch means to be connected in circuit with a reversible motor for causing rotation of the latter in a desired direction; a rotatable cam for operating said switch, said cam having three operating positions of which the center position operates said switch to open circuit status and the adjacent positions throw said switch to one or the other circuit closing condition to effect desired directional rotation of said motor; a shaft for rotating said cam, means for rotating said shaft, including a main plate affixed thereto; a second plate freely rotatable on said shaft and engageable with said main plate to rotate the same; detent means for restraining rotation of said first plate; toggle spring means connecting said plates to establish either of two positions of stable equilibrium of said second plate relative to said first plate; retractable arm means for engaging said second plate to rotate the same in the direction of desired cam shaft rotation, said detent means releasing, after rotation of said second plate through a pre-determined arc whereby said main plate and said cam shaft will rotate to establish one closed circuit position of said switch; means on said second plate engageable by said arm upon a second operation thereof to return said second plate and the therewith associated main plate to open circuit switch position, and engageable with said arm upon a third operation thereof to rotate said plates and cam shaft in the direction to establish the other circuit closing position of said switch; and means for operating said arm means.

2. In a door operating mechanism in combination, movable switch means to be connected in circuit with a reversible motor for causing rotation of the latter in a desired direction; a rotatable cam engaging with said switch for operating the same to the desired throw position, said cam having three operating positions, the central position operating said switch to open circuit status and the adjacent positions establishing one or the other of its closed circuit positions for the respective motor rotating directions; and means for rotating said cam from its central position to one or the other of its switch closing positions; including a cam shaft; a main plate affixed thereto; a selector plate freely rotatable on said cam shaft and engageable with said main plate, after a predetermined rotation to rotate said main plate in the same direction; said selector plate having notches corresponding to the three operating positions of said cam; a reciprocating arm normally retracted out of engagement with said selector plate and movable toward said selector plate for driving engagement with one of said notches to effect rotation of the plates in one direction, the spacing and disposition of the notches of said selector plate being such that after said rotation of said selector plate a second notch is so disposed relative to said arm that the next movement of said actuating arm rotates said selector plate and therewith associated said main plate and cam shaft in the opposite direction to restore said cam shaft to its first position; and means for driving said arm into operative engagement with said selector plate.

3. In a door operating mechanism in combination, movable switch means to be connected in circuit with a reversible motor for causing rotation of the latter in a desired direction; a rotatable cam engaging with said switch operating the same to the desired throw position, said cam having three operating positions, the central position operating said switch to open circuit status and the adjacent positions establishing one or the other of its closed circuit positions for the respective motor rotating directions; and means for rotating said cam from its central position to one or the other of its switch closing positions; including a cam shaft; a main plate affixed thereto; a selector plate freely rotatable on said cam shaft and engageable with said main plate to rotate the same, said selector plate having notches corresponding to the three operating positions of said cam; a reciprocating arm normally retracted out of engagement with said selector plate and movable toward said selector plate for driving engagement with one of said notches to rotate the selector plate in one direction; the spacing and disposition of the notches of said plate being such that the next movement of said actuating arm rotates said plate and therewith associated main plate and cam shaft in the opposite direction to restore said cam shaft to its initial position; and the next operation of said actuating arm engages a notch of said selector plate to rotate said plate and its associated main plate and cam shaft to operate said switch to the second of its closed circuit positions; and remotely controlled means for effecting movement of said actuating arm.

4. In a door operating mechanism in combination, movable switch means to be connected in circuit with a reversible motor for causing rotation of the latter in a desired direction; a rotatable cam for operating said switch to open circuit position or to either of its direction-establishing closed circuit positions; means for rotating said cam, including a cam shaft; a main plate affixed thereto; a selector plate freely rotatable on said cam shaft and engageable with said main plate to rotate the same; means for rotating said selector plate, including an actuating arm engageable therewith; cam means having downwardly convergent edge surfaces each adapted individually to angularly intersect the path of movement of said arm to deflect the same to a point of driving engagement with said plate eccentric of said cam shaft for rotation of said plate; a second cam moved by rotation of said plate into the path of movement of said arm to deflect said plunger, upon subsequent driving movement thereof, to rotate said plate in reverse direction sufficient to dispose the other edge of said first named cam means into the path of movement of said arm, whereby during another driving movement of said plunger the same is deflected to cause rotation of said plate additionally in said reverse direction; a third cam moved by said third rotation of said plate to cause said arm again to deflect, prior to driving engagement with said plate, to return said plate to its initial position; solenoid means for driving said actuating arm in the direction of said selector plate; and spring means for retracting said arm into position for subsequent driving movements.

5. A mechanism according to claim 4, including means engaging with said actuating arm to deflect said arm out of engagement with said cam surfaces just prior to the completion of the driving stroke of said arm.

6. In a door operating mechanism in combination, movable switch means to be connected in circuit with a reversible motor for causing rotation of the latter in a desired direction and having two closed circuit positions for operating the motor in its respective directions and an intermediate open circuit position for stopping the motor; a rotatable cam for operating said switch to open circuit position or to either of its direction establishing closed circuit position means for rotating said cam, including a cam shaft; a main plate affixed thereto; a selector plate freely rotatable on said cam shaft and engageable with said main plate to rotate the same; means for rotating said selector plate, including an actuating arm mounted for driving movement radially thereof, and a plurality of cam means disposed on said selector plate and successively cooperating with said actuating arm to deflect the same into eccentric engagement with said selector plate to rotate the same, said cam means being disposed on said plate to cause deflection of said actuating arm during successive driving movements thereof to effect rotation of said selector plate in one direction from said intermediate position, a rotation of said plate in the opposite direction, a third rotation of said plate in the second named direction, and a fourth rotation of said plate in the first named direction, each such rotation of said plate being from one of said switch positions to the next adjacent position in the named direction; and means for effecting said driving movements of said actuating arm.

7. A control for a reversible motor, said control including switch means to be connected in circuit with such a motor for establishing an open circuit condition or either of two closed circuit conditions respectively effecting a forward or reverse rotation of said motor; switch actuating means for throwing said switch from one closed circuit position to open circuit position and then to the opposite closed circuit position upon successive operations of said actuating means; and remotely controllable means actuatable at will for so operating said switch actuating means.

8. A control for a reversible motor, said control including switch means to be connected in circuit with such a motor for establishing an open circuit condition or either of two closed circuit conditions respectively effecting a forward or reverse rotation of said motor; switch actuating means operable for throwing said switch from open circuit position to a closed circuit position establishing a direction of motor rotation opposite to the direction of rotation resulting from the immediately preceding closed circuit position and operable for throwing said switch from either closed circuit position to open circuit position; means for operating said switch actuating means at will; and means for automatically returning said switch means to open circuit position after a pre-determined period of operation of said motor in either direction of rotation.

9. A control for a reversible motor, said control including switch means to be connected in circuit with such a motor for establishing an open circuit condition or either of the two closed circuit conditions respectively effecting forward and reverse rotation of said motor; rotatable switch actuating means operable for throwing said switch from open circuit position to a closed circuit position establishing a direction of motor rotation opposite to the direction of rotation resulting from the immediately preceding closed circuit position and operable for throwing said switch from either said closed circuit position to said open circuit position; means for operating said switch actuating means; a rotatable shaft mounted adjacent said rotatable switch actuating means; means mechanically connecting said shaft with said rotatable switch actuating means for rotating the latter from closed circuit position to open-circuit establishing position; toggle spring means for restraining rotation of said switch actuating means until said rotatable shaft has rotated through a pre-determined arc; and means driven by said motor for rotating said shaft through the necessary arc after a pre-determined period of operation of said motor.

10. A control for a reversible motor, said control including switch means to be connected in circuit with such a motor for establishing an open circuit condition or either of the two closed circuit condition respectively effecting forward and reverse rotation of said motor; rotatable switch actuating means operable for throwing said switch from open circuit position to a closed circuit position establishing a direction of motor rotation opposite to the direction of rotation resulting from the immediately preceding closed circuit position and operable for throwing said switch from either closed circuit position to open circuit position; means for operating said switch actuating means; a rotatable shaft mounted adjacent said rotatable switch actuating means; means mechanically connecting said shaft with said rotatable switch actuating means for rotating the latter from closed circuit position to open-circuit establishing position; toggle spring means for restraining rotation of said switch actuating means until said rotatable shaft has rotated through a pre-determined arc; and means effective when said door approaches either its open or closed position for rotating said shaft through the necessary arc.

11. A control for a reversible motor, said control including switch means to be connected in circuit with such a motor for establishing an open circuit condition or either of two closed circuit conditions respectively effecting forward and reverse rotation of said motor; rotatable switch actuating means for throwing said switch from open circuit position to a closed circuit position establishing a direction of motor rotation opposite to the direction of rotation resulting from the immediately preceding closed circuit position; means for operating said switch actuating means; and a walking beam mechanically connected with said rotatable switch actuator means; and means driven by said motor for engaging with said walking beam after a pre-determined period of operation of said motor for rotating said walking beam to produce a rotation of said switch actuating means to return the latter to open-circuit establishing position.

12. A control for a reversible motor, said control including switch means to be connected in circuit with such a motor for establishing an open circuit condition or either of two closed circuit conditions respectively effecting forward and reverse rotation of said motor; rotatable switch actuating means for throwing said switch from open circuit position to a closed circuit position establishing a direction of motor rotation opposite to the direction of rotation resulting from the immediately preceding closed circuit position; means for operating said switch actuating means; and a walking beam; toggle spring means connecting said walking beam and said rotatable switch actuating means for rotating the latter to open-circuit establishing position after a pre-determined rotation of said walking beam; and means driven by said motor for effecting the necessary rotation of said walking beam after a pre-determined period of operation of said motor.

13. In a door operating mechanism in combination, movable switch means to be connected in circuit with a reversible motor for effecting desired directional rotation of said motor; a cam for operating said switch means; a shaft for rotating said cam; means for rotating said cam shaft to close said switch circuit, said means including a main plate affixed to said shaft and a selector plate freely rotatable on said shaft and engageable with said main plate for rotating the same; means for rotating said selector plate to establish a closed circuit position of said switch means; means for opening said motor circuit prior to complete movement of said door to open or closed position, said means including a walking beam, a threaded shaft driven by said motor, a traveller on said shaft and movable therealong upon rotation thereof; means on said traveller engaging with said walking beam to rotate the same; a third plate freely rotatable on said cam shaft and engageable with said selector plate to rotate the same; a fourth plate freely rotatable on said cam shaft and adapted to be rotated by rotation of said walking beam; toggle spring means connecting said third and fourth plates, the rotation of said fourth plate tensioning said toggle spring means; means for restraining the rotation of said third plate during the tensioning of said spring; and means for subsequently releasing said third plate for rotation by said toggle spring to cause the said plate to operate said selector plate and said main plate to rotate the cam shaft to open circuit position.

14. In a door operating mechanism in combination movable switch means to be connected in circuit with a reversible motor for establishing an open circuit position thereof or for establishing a motor control circuit for effecting desired directional rotation of said motor; a cam for operating said switch means; a shaft for rotating said cam; means for rotating said cam shaft to close said switch circuit, said means including a main plate affixed to said shaft and a selector plate freely rotatable thereon and engageable with said main plate for rotation thereof; means for rotating said selector plate to establish a closed circuit position of said switch means; means for opening said motor circuit prior to complete movement of said door to open or closed position, said means including a walking beam; a threaded shaft driven by said motor; a traveller on said shaft and movable therealong upon rotation thereof; means on said traveller engaging with said walking beam to rotate the same; a third plate freely rotatable on said cam shaft and engageable with said selector plate and main plate to rotate the same and the therewith associated cam shaft to open circuit position; a fourth plate freely rotatable on said cam shaft; means affixed to said walking beam shaft for rotation therewith, said means being drivingly associated with said fourth plate to rotate the same upon rotation of said walking beam; toggle spring means connecting said third and fourth plates, rotation of said fourth plate tensioning said toggle spring means; and means on said fourth plate driving means for restraining the rotation of said third plate during the tensioning of said spring; said means subsequently releasing said third plate upon further rotation of said walking beam to permit the reaction of said toggle spring to rotate said third plate for operation of said selector and said main plates to rotate the cam shaft to open circuit position.

15. A control for a reversible motor including switch means to be connected in circuit with a reversible motor for effecting forward or reverse rotation of said motor; switch actuating means operable for throwing said switch means from open circuit position to a closed circuit position establishing a direction of motor rotation opposite to the direction of rotation resulting from the immediately preceding closed circuit position and operable for throwing said switch means from closed circuit to open circuit position; a walking beam pivotally supported for rotation; means operated by said motor and engaging one or the other end of said walking beam according to direction of motor operation to rotate said walking beam through a pre-determined arc in clockwise or counter-clockwise rotation according to the end of said beam which has been engaged; and means for operating said switch means to open circuit position upon rotation of said walking beam through said arc.

16. In an apparatus of the type described, a reversing and current-controlling switch assembly to be coupled in circuit with a reversible motor which is to be connected to a door opening and closing mechanism, means responsive to manual operation for controlling said assembly, switch means forming a part of said assembly whereby in response to an operation of said manual means said switch means will close to cause a rotation of the motor in one direction, in response to a further operation thereof said switch means will interrupt current flow to the motor and in response to a still further operation said switch means will function to cause current flow such that the motor will rotate in a reverse direction, a mechanical assembly connected to move in synchronism with door movements and means connecting said mechanical assembly with said switch assembly and controlling means to cause opening and reversing of said switch means as the door moves to open and closed position.

17. In combination, forward and reverse operating circuits for a reversible motor, a momentary contact switch actuatable at will, a multiple switch means for controlling said motor circuits and having one closed position for closing only the forward motor circuit, another closed position for closing only the reverse motor circuit and an intermediate open position for opening both motor circuits to stop said motor, means operated by a single actuation of said momentary contact switch for operating said multiple switch means from open position to one of its closed positions for operation of said motor in a direction opposite to that in which it was last previously operated and for continuing to so operate said motor after such actuation of such momentary contact switch, means for automatically returning said multiple switch means to its open position in response to predetermined such continued motor operation to leave said motor in stopped condition in absence of further actuation of said momentary contact switch, means for operating said multiple switch from said open position to its opposite closed position in response to any next following actuation of said momentary contact switch for operating said motor in its opposite direction during and following such actuation, and means operable by reactuation of said momentary contact switch during operation of said motor but before said automatic means is operated, for returning said multiple switch from closed position to open position to interrupt motor operation during and following such last named actuation of said momentary contact switch and until such momentary contact switch is again actuated.

References Cited in the file of this patent

UNITED STATES PATENTS

| Number | Name | Date |
|---|---|---|
| 1,422,931 | Crane | July 18, 1922 |
| 1,916,651 | Beeman et al. | July 4, 1933 |
| 1,971,865 | Matthews | Aug. 28, 1934 |
| 1,972,695 | Staude | Sept. 4, 1934 |
| 2,056,174 | Earhuff | Oct. 6, 1936 |
| 2,342,597 | Opalek | Feb. 22, 1944 |
| 2,343,951 | Blodgett | Mar. 14, 1944 |
| 2,378,262 | Vallen | June 12, 1945 |
| 2,412,871 | Clark | Dec. 17, 1946 |
| 2,435,440 | Graham | Feb. 3, 1948 |
| 2,532,722 | Kaytor | Dec. 5, 1950 |